United States Patent
Malkes et al.

(10) Patent No.: US 11,450,201 B2
(45) Date of Patent: Sep. 20, 2022

(54) ADAPTIVELY CONTROLLING TRAFFIC MOVEMENTS FOR PEDESTRIAN SAFETY

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(73) Assignee: Cubic Corporation, San Diego, CA (US)

( * ) Notice: Subject to any disclaimer, the term of this patent is extended or adjusted under 35 U.S.C. 154(b) by 636 days.

(21) Appl. No.: 16/395,853

(22) Filed: Apr. 26, 2019

(65) Prior Publication Data

US 2019/0333370 A1   Oct. 31, 2019

Related U.S. Application Data

(60) Provisional application No. 62/664,012, filed on Apr. 27, 2018.

(51) Int. Cl.
*G08G 1/005* (2006.01)
*G08G 1/01* (2006.01)
(Continued)

(52) U.S. Cl.
CPC ............... *G08G 1/005* (2013.01); *G06T 7/20* (2013.01); *G06T 7/70* (2017.01); *G08G 1/0125* (2013.01);
(Continued)

(58) Field of Classification Search
CPC ...... G08G 1/005; G08G 1/0125; G08G 1/166; G06T 7/70; G06T 7/20; G06T 2207/30196; G06T 2207/30236; G06T 2207/30242
See application file for complete search history.

(56) References Cited

U.S. PATENT DOCUMENTS 5,734,339 A   3/1998 Ogle
6,384,742 B1  5/2002 Harrison
(Continued)

OTHER PUBLICATIONS

International Search Report and Written Opinion dated Jul. 17, 2019 in related foreign application No. PCT/US2019/029719, 13 pgs.

*Primary Examiner* — Hussein Elchanti
*Assistant Examiner* — Hussein A El Chanti
(74) *Attorney, Agent, or Firm* — Kilpatrick Townsend & Stockton LLP

(57) ABSTRACT

The present disclosure is directed to methods and apparatus that monitor pedestrian traffic and that adjust the behavior of traffic signals at intersections and "walk"-"do not walk" indicators associated with particular crosswalks. Methods and apparatus consistent with the present disclosure may receive image or sensor data, may monitor the status of different traffic flow, and may adjust the timing of signal lights or walking indications as conditions change at an intersection. In certain instances, a traffic controller at one intersection may receive information collected by other traffic controllers along a set of streets that lead to a particular intersection. Traffic controllers that receive images of an intersection may identify partition the intersection into a set of safe and unsafe zones as those traffic controllers identify when pedestrians can safely cross an intersection.

20 Claims, 9 Drawing Sheets

(51) Int. Cl.
*G08G 1/16* (2006.01)
*G06T 7/20* (2017.01)
*G06T 7/70* (2017.01)

(52) U.S. Cl.
CPC .... *G08G 1/166* (2013.01); *G06T 2207/30196* (2013.01); *G06T 2207/30236* (2013.01); *G06T 2207/30242* (2013.01)

(56) References Cited

U.S. PATENT DOCUMENTS

| | | |
|---|---|---|
| 7,777,646 B2 | 8/2010 | Konforty et al. |
| 7,864,072 B2 | 1/2011 | Basson et al. |
| 2004/0027828 A1 | 2/2004 | Awa |
| 2007/0250240 A1* | 10/2007 | Reisner ............... B60T 7/18 701/70 |
| 2010/0214129 A1 | 8/2010 | Marti et al. |
| 2014/0191882 A1 | 7/2014 | Varma |
| 2014/0211487 A1* | 7/2014 | Spiro ............... F21V 23/06 362/382 |
| 2015/0003087 A1* | 1/2015 | Futamura ............ B60Q 9/008 362/466 |
| 2015/0035437 A1 | 2/2015 | Panopoulos et al. |
| 2015/0170498 A1* | 6/2015 | Beggs ............... B60Q 9/008 340/686.6 |
| 2015/0210279 A1 | 7/2015 | Agnew et al. |
| 2016/0122956 A1 | 5/2016 | Christiansen et al. |
| 2016/0137208 A1* | 5/2016 | Powers ............. B60W 30/00 701/36 |
| 2019/0333370 A1* | 10/2019 | Malkes ............... G06T 7/70 |

\* cited by examiner

ADAPTIVELY CONTROLLING TRAFFIC MOVEMENTS FOR PEDESTRIAN SAFETY

CROSS-REFERENCE TO RELATED APPLICATIONS

The present application claims priority benefit of U.S. provisional patent application 62/664,012 filed Apr. 27, 2018 the disclosure of which is incorporated by reference.

BACKGROUND OF THE INVENTION

1. Field of Invention

The present disclosure is generally related to traffic control systems. More specifically, the present disclosure is directed to increasing the safety of pedestrian crossings.

2. Description of the Related Art

Control of vehicular traffic on roads is very essential for transportation of persons and goods. Typically, the vehicular traffic is controlled by traffic control systems. These traffic control systems regulate flows of traffic through an intersection. Generally, traffic lights are mounted in an elevated position such that traffic signal indicators can be easily viewed. Commonly, traffic lights are used to regulate the movement of traffic that traverse over different roads. In certain instances, traffic controls systems may also include cameras that may be configured to collect video and these cameras may also be used to detect vehicles driving along a roadway.

Such camera detection systems may capture video of traffic at an intersection. In certain instances, these camera detection systems may require users to manually create "zones" at the intersection for managing traffic. These zones may be created based on the presence of lines that identify a zone associated with a pedestrian crosswalk. Today amounts of traffic in many cities are increasing and this increase in traffic raises concerns for the safety of pedestrians, especially when those pedestrians cross busy intersections. Currently, traffic controls systems do not track the position of pedestrians, however. As such these current systems lack efficient mechanisms that allow the flow of traffic to be adapted based on pedestrian movement. Current traffic controls systems, therefore, are not optimized to maximize pedestrian safety.

What are needed are new methods and apparatus directed to increasing pedestrian safety.

SUMMARY OF THE PRESENTLY CLAIMED INVENTION

The presently claimed invention may be implemented as a method, a non-transitory computer readable storage medium, or a system that increases pedestrian safety. A method consistent with the present disclosure may receive an image of an intersection, identify safe and unsafe zones at the intersection, identify a location of a person at the interaction, and identify a condition associated with the intersection. Methods consistent with the present disclosure may also activate a light to illuminate a person at the identified location based on the identified condition.

When the presently claimed invention is implemented as a non-transitory computer readable storage medium a processor executing instructions out of the memory may also perform a method consistent with the present disclosure. Here again the method may receive an image of an intersection, identify safe and unsafe zones at the intersection, identify a location of a person at the interaction, identify a condition associated with the intersection, and activate a light to illuminate a person at the identified location based on the identified condition.

A system consistent with the present disclosure may include a camera that captures an image of an intersection and a controller that received the image from the camera. After the controller receives the image, the controller may identify safe and unsafe zones at the intersection, identify a location of a person at the intersection, and identify a condition associated with the intersection. The presently claimed system may also include a light that is activated by the controller that illuminates the person at the identified location based on the identified condition.

DETAILED DESCRIPTION

The present disclosure is directed to methods and apparatus that monitor pedestrian traffic and that adjust the behavior of traffic signals at intersections and "walk"-"do not walk" indicators associated with particular crosswalks. Methods and apparatus consistent with the present disclosure may receive image or sensor data, may monitor the status of different traffic flows, and may adjust the timing of signal lights or walking indications as conditions change at an intersection. In certain instances, a traffic controller at one intersection may receive information collected by other traffic controllers along a set of streets that lead to a particular intersection. Traffic controllers that receive images of an intersection may identify partition the intersection into a set of safe and unsafe zones as those traffic controllers identify when pedestrians can safely cross an intersection. These traffic controllers may also be configured to provide new types of instructions to pedestrians that may warn pedestrians of dangerous traffic conditions before a dangerous condition develops into an accident.

Figure 1:
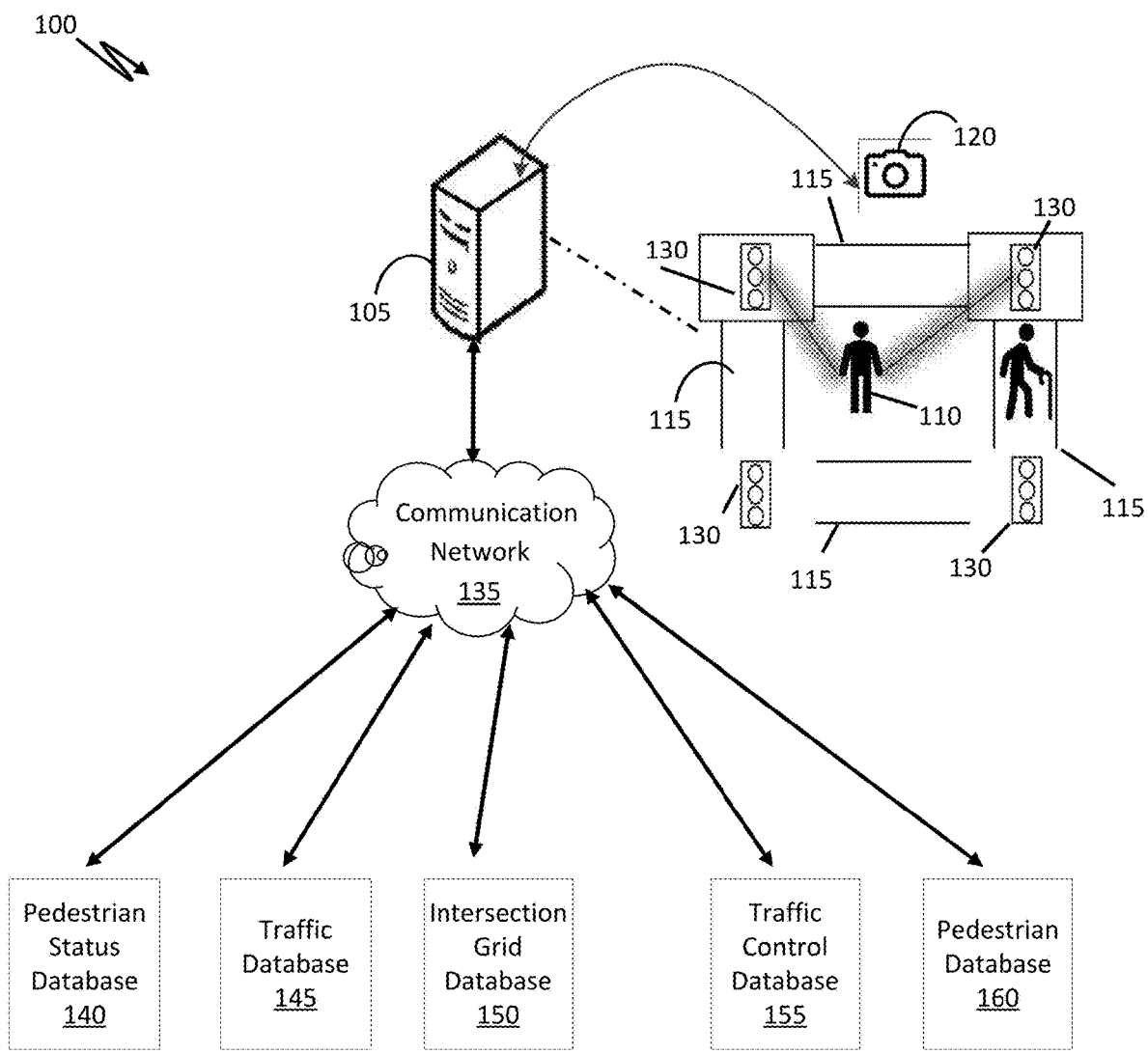
FIG. 1 illustrates a system that may be used to optimize pedestrian safety.

FIG. 1 illustrates a system that may be used to optimize pedestrian safety. The system 100 of FIG. 1 includes computer 105, camera 120, communication network 135, pedestrian status database 140, traffic database 145, intersection grid database 150, traffic control database 155, and pedestrian database 160. Camera 120 may acquire images of an intersection that includes crosswalks 115 and signal lights 130. Camera 120 may also capture images of pedestrians 110 that are located at or near the intersection. Acquired image data may be provided to computer 105 that may identify and highlight a location associated with pedestrian 110. Computer 105 may also identify whether pedestrian 110 is located in a crosswalk or is located near an intersection. Computer 105 may also adjust the timing of signal lights 130 or may turn on or turn off appropriate pedestrian warning signs. Computer 105 may also identify other objects in or near the intersection. For example, computer 105 may identify vehicles, animals, or other objects located in or near the intersection from received image data from camera 120.

Computer 105 may be communicatively coupled to other electronic devices via communication network 135. Computer 105 may access data stored at pedestrian status database 140, traffic database 145, intersection grid database 150, traffic control database 155, or pedestrian database 160 via network 135. Alternatively, computer 105 may access data stored in a memory of computer 105. The various databases illustrated in FIG. 1 may store data associated with certain tasks. For example the pedestrian status database 140 may store information that cross references a pedestrian identifier (ID) with an intersection identifier and a safe or unsafe pedestrian status. As such, pedestrian status database 140 may be used to identify when pedestrians have entered safe or unsafe zones at particular intersections.

Traffic database 145 may store information that cross-references intersection IDs with travel directions, vehicle counts, times/dates, and indications as to whether traffic conditions are heavy, normal, or dangerous. Intersection grid database 150 may be used to identify locations in an intersection where pedestrian are currently walking. The locations may be identified according to any of a number of granularities or accuracies that may include a fine accuracy or a coarse accuracy and these locations may also be identified as being in a safe or in an unsafe zone of the intersection. Traffic control database 155 may be used to store information that cross-references intersection IDs with travel directions, traffic status indicators (that may include heavy, moderate, light, or dangerous traffic status), safe/unsafe pedestrian status, light status action indicators, and with indications as to whether a pedestrian is illuminated with a pedestrian safety light. Pedestrian database 160 may be used to store information that tracks the movement of pedestrians as they move through different locations in an intersection. Pedestrian database 160 may store pedestrian IDs, intersection IDs, location IDs, and time stamps that may be used to see how long it took for a particular pedestrian to cross an intersection.

Communication network 135 may be a wired and/or a wireless network. Exemplary wireless network include, yet are not limited to networks that use visible light communications (VLC), worldwide interoperability for microwave access (WiMAX), long term evolution (LTE), wireless local area network (WLAN), infrared (IR), public switched telephone network (PSTN), radio waves, or other wireless communication technologies known in the art. By using different databases, data associated with managing safety in an intersection may be segregated such that particular types of data may be more quickly accessed.

Figure 2:
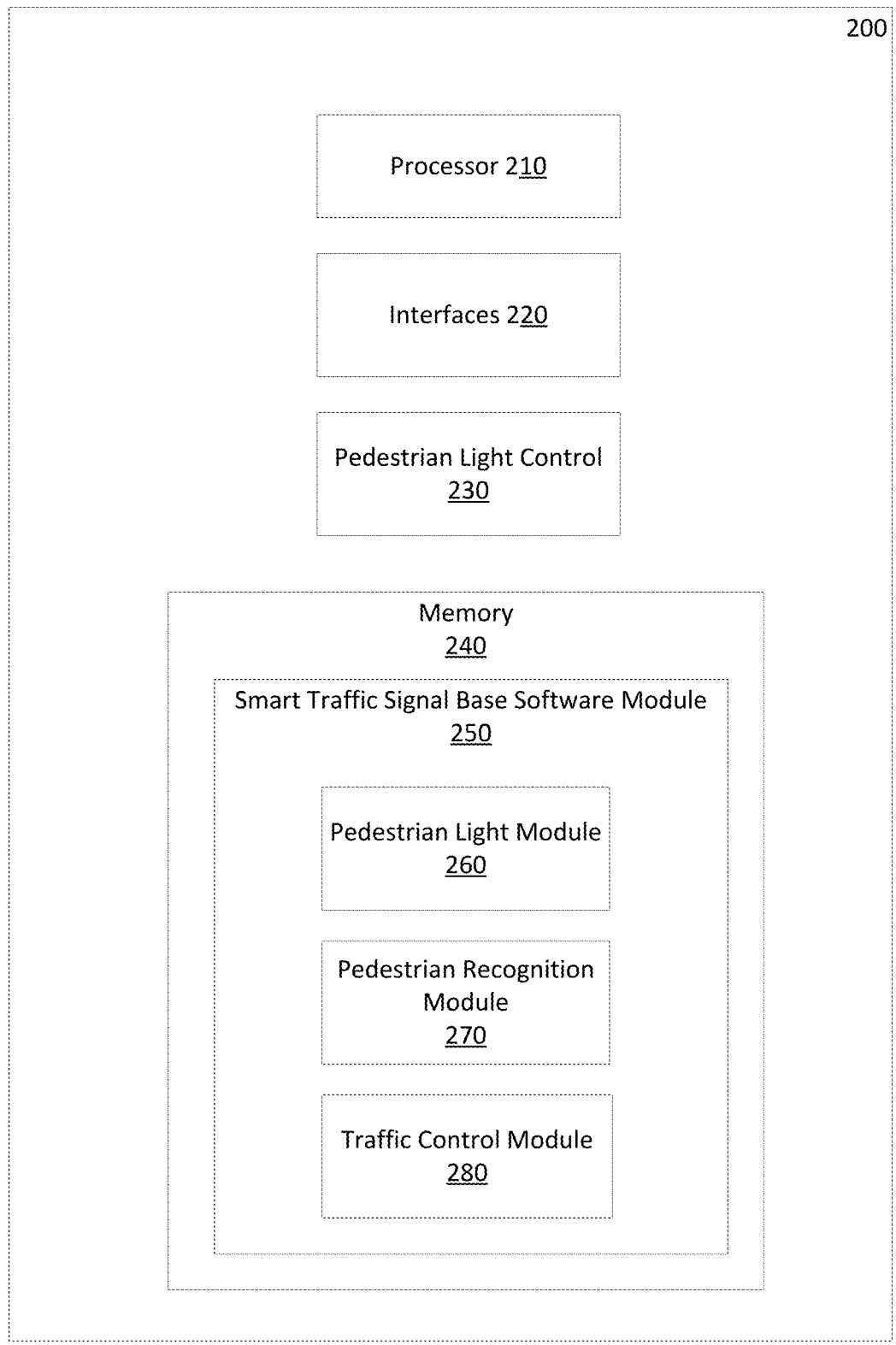
FIG. 2 illustrates various different components that may be included in a computer that manages safety of an intersection.

FIG. 2 illustrates various different components that may be included in a computer that manages safety of an intersection. Computer 200 of FIG. 2 includes processor 210, interfaces 220, pedestrian light control hardware 230, and memory 240. Computer 200 may be the same computer as computer 105 of FIG. 1. Processor 210 may execute instructions out of memory 240. Memory 240 may store various different sets of instructions associated with one or more different software modules or programs. FIG. 2 includes a smart traffic signal base software module 250, a pedestrian light software module 260, a pedestrian recognition software module 270, and a traffic control module 280. The traffic signal base module 250 may be used to receive and process data acquired by a camera, divide images of an intersection into a grid that includes multiple boxes or cells, identify objects at an intersection, and receive indications that an action should be initiated at an intersection. The need for a particular action may have been identified by program code associated with a traffic control module 280. Such actions may include changing the status of a "walk" indication, changing signal timing, or identifying that a pedestrian light should be illuminated. Pedestrian light software module 260 may receive a command from signal base module 250 to illuminate a light at an intersection after which the pedestrian light software module 260 may interact with pedestrian recognition software module 270 to retrieve pedestrian location information such that the pedestrian light software module 260 can illuminate pedestrians as they cross an intersection. traffic control software module 280 may be used to cross-reference particular pedestrians with one or more pedestrian statuses. Traffic control software module 280 may use this status information to identify when timing at an intersection should be modified or may inform the traffic signal base module that a pedestrian light should be illuminated.

Processor 210 may execute an algorithm stored in memory 240 for adaptively controlling traffic movements, for pedestrian safety. Processor 210 may also be configured to decode and execute any instructions received from one or more other electronic devices or server(s). Processor 210 may include one or more general purpose processors (e.g., INTEL® or Advanced Micro Devices® (AMD) microprocessors) and/or one or more special purpose processors (e.g., digital signal processors or Xilinx® system-on-chip (SOC) field programmable gate array (FPGA) processor). Processor 210 may be configured to execute one or more computer-readable program instructions, such as program instructions to carry out any of the functions described in the present disclosure.

Interface(s) 220 may help an operator interact with the traffic control computer 200 of FIG. 1. Interface(s) 220 of the traffic control system 102 may either accept an input from the operator or provide an output to the operator, or may perform both these actions. Interface(s) 220 may include a command line interface (CLI), a graphical user interface (GUI), or a voice interface. When a voice interface is used, processor 210 may execute software out of memory 240 that performs a speech recognition function. Interfaces 220 may also include menu driven interactions, text interfaces, keyboard shortcuts, pointers, scripts, or a control panel that an operator can use to configure traffic control computer 200.

Memory 240 may include any form of memory. As such, memory 240 may include, hard disk drives, FLASM memory, magnetic tape, floppy diskettes, optical disks, compact disc read-only memories (CD-ROMs), magneto-optical disks, semiconductor memories, such as ROMs, random access memories (RAMs), programmable read-only memories (PROMs), erasable PROMs (EPROMs), electrically erasable PROMs (EEPROMs), magnetic cards, optical cards, or other type of media/machine-readable medium suitable for storing electronic instructions.

In one instance, a pedestrian lighting device may be installed at an intersection. Such a pedestrian lighting device may include lights positioned towards all crosswalks located at an intersection. Cameras located at an intersection may be coupled to computer 200 when image data of the intersection is collected. Computer 200 may perform functions equivalent to computer 105 of FIG. 1 and may also execute instructions associated with smart traffic signal base software module 250, pedestrian light software module 260, pedestrian recognition software module 270, or traffic control module 280. As such, computer 200 may use captured video data to identify and track pedestrians moving across or through an intersection. Furthermore, multiple cameras may be used for tracking the pedestrians in different locations within an intersection.

Figure 3:
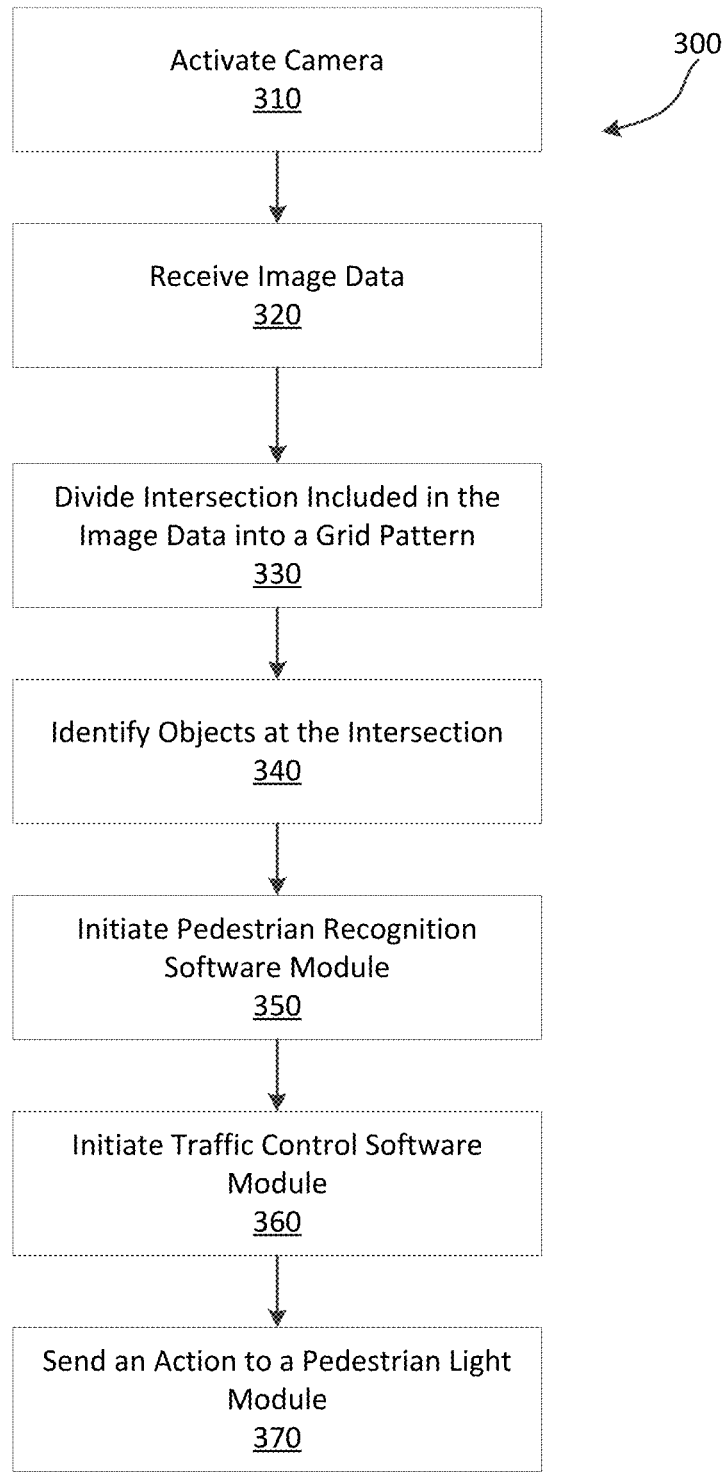
FIG. 3 illustrates steps that may be executed by a processor when that processor identifies objects at an intersection when actions are identified that can increase pedestrian safety. performing
Figure 9:
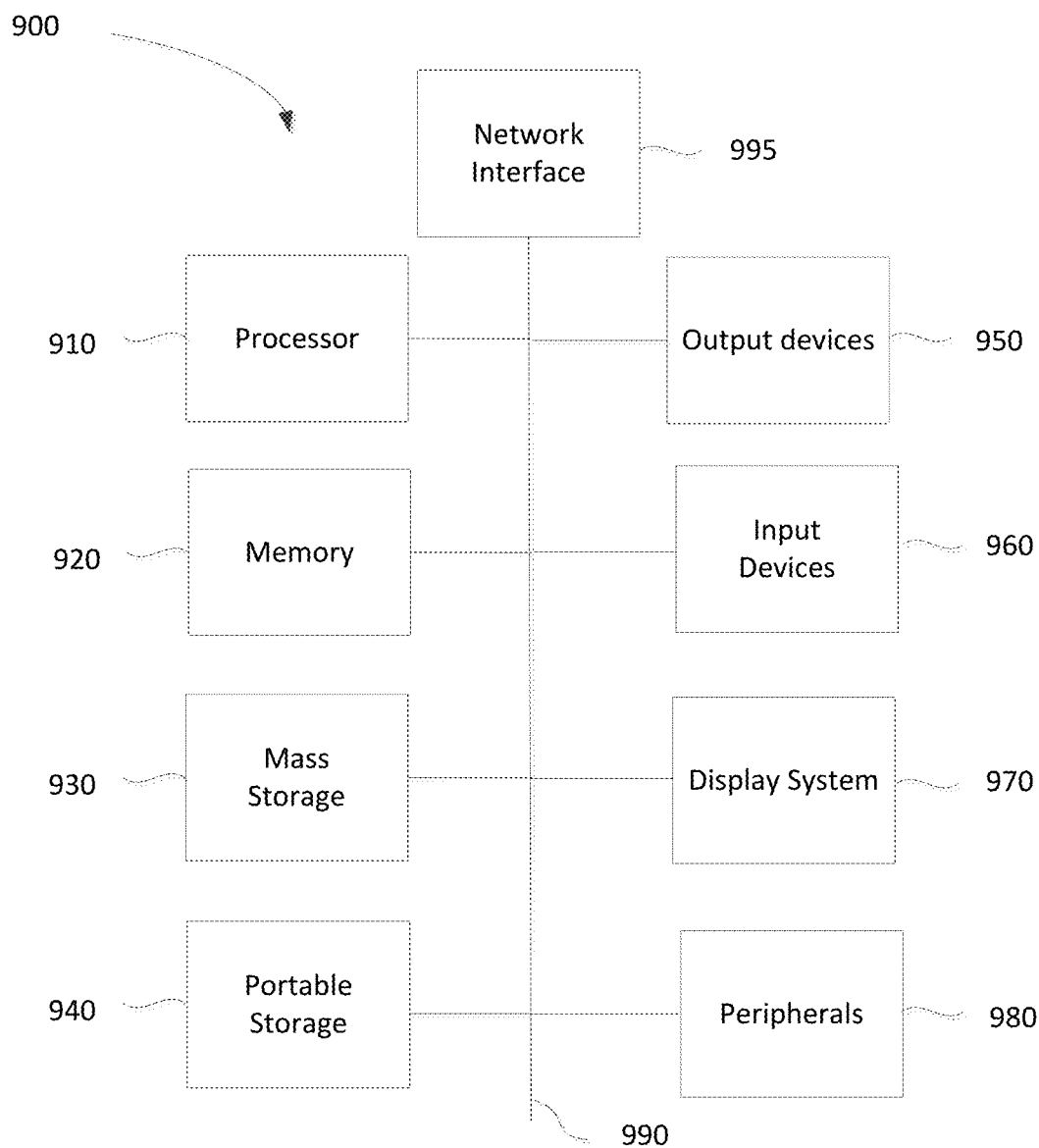
FIG. 9 illustrates a computing system that may be used to implement an embodiment of the present invention.

In certain instances computer 200 may receive information from other traffic control computer systems via a communication interface like those discussed in context of FIG. 9. The information received from these other computers may identify an amount of traffic that will flow toward the intersection associated with computer 200. This information may also identify that emergency vehicles are proceeding toward the intersection controlled by computer 200 or may identify that a vehicle is speeding toward the intersection controlled by computer 200. Computer 200 may then change the timing of pedestrian crossing "walk" indications based on increasing traffic, the presence of emergency vehicles, or the fact that a vehicle is speeding toward a particular intersection FIG. 3 illustrates steps that may be executed by a processor when that processor identifies objects at an intersection when actions are identified that can increase pedestrian safety. The steps included in FIG. 3 may be associated with program code that performs functions consistent with the traffic signal base software module 250 of FIG. 2. In step 310 of FIG. 3 a camera at an intersection may be activated. After activation of the camera, image data may be received by a processor for evaluation in step 320. In certain instances, smart traffic signal base module 300 may perform functionality consistent with the traffic signal base software module 250 of FIG. 2 to receive images of the intersection from the camera. One or more cameras may be positioned such that a complete view of the intersection can be constructed. In certain instances, views from different cameras may be stitched together to form a panoramic image of the intersection.

In step 330 of FIG. 3, the processor may divide video data of the intersection into a grid pattern that divides an image of the intersection into a set of boxes or cells. After step 330, the processor may then execute program code that allows the processor to identify objects in or near the intersection in step 340 of FIG. 3. Since the grid pattern of step 330 may include a plurality of cells or boxes, each of these different cells may be classified into safe or unsafe categories or zones according to pre-determined rules and this information may be stored in the intersection grid database 150 of FIG. 1. For example, cells of a grid that lie on sidewalks or crosswalks may be classified as "safe" where cells of the grid lying in middle of the intersection may be classified as "unsafe.".

After step 340, another software program module may perform functions consistent with the pedestrian recognition software module 270 of FIG. 2. in step 350 by the processor to identify pedestrians located near or in an intersection. Next, in step 360, operations consistent with the traffic software control module 280 of FIG. 2 may be implemented. After step 360, an action may then be sent to a pedestrian light software module in step 370 of FIG. 3. The pedestrian light software module may include instructions that cause information to be presented on an electronic sign at the intersection when functions consistent with the pedestrian light module 260 of FIG. 2 are performed. Information presented on an electronic sign may inform pedestrians of a safety concern associated with crossing the intersection. For example, an electronic sign may display a warning that indicates that emergency vehicles will be passing through the intersection, such that pedestrians may clear crosswalks at that intersection before those emergency vehicles arrive. Such warnings could be provided by computers that are located down the street from a particular intersection, such that a computer at that particular intersection could post the pedestrian warning before the emergency vehicles arrive.

Camera data may be received by a processor as pedestrians move across an intersection. In one case, the video may be used to identify presence of a pedestrian moving across a lane, and track the pedestrian as that pedestrian crosses an intersection. Cameras consistent with the present disclosure may include a fish-eye (wide angle) camera, a closed circuit television (CCTV) camera, or an infrared camera, for example. Furthermore, sensors such as induction loops may also be used along with a camera to detect the presence of vehicles or objects at or near an intersection. In certain instances, a smart traffic signal base module may continuously poll or pull image data from a camera and a computer may identify that certain objects are present at an intersection. In certain instances, a pedestrian recognition software module may include instructions that allow a processor to determine whether any identified object is a pedestrian or not. Such a pedestrian recognition module may also compute a pedestrian status and a traffic status, after which the processor may once again execute instructions associated with functions of the smart traffic signal base module.

Figure 4:
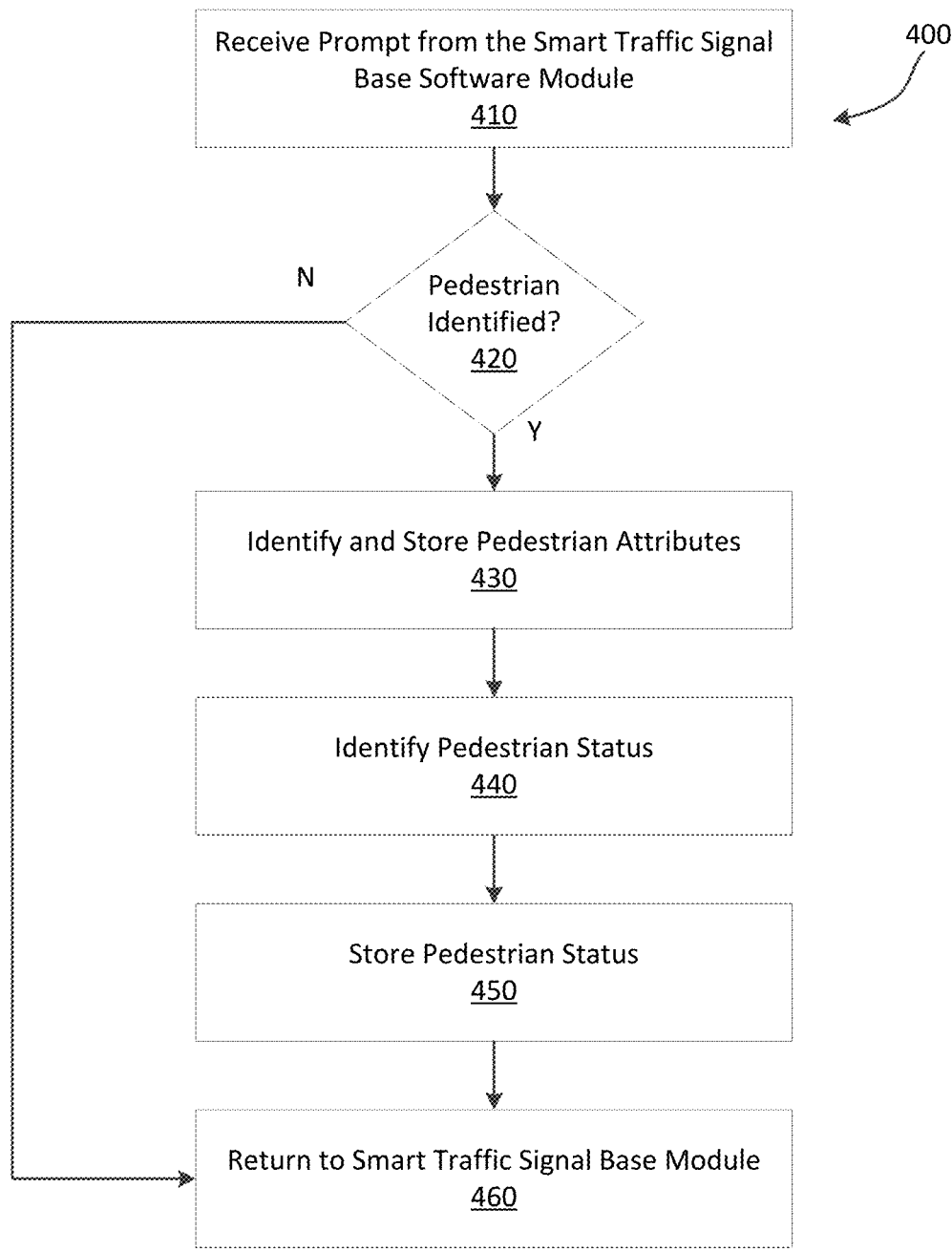
FIG. 4 illustrates a set of steps of program code that may be used to identify locations of pedestrians at or near an intersection.

FIG. 4 illustrates a set of steps of program code that may be used to identify locations of pedestrians at or near an intersection. The program code 400 illustrated in FIG. 4 may perform functions consistent with the pedestrian recognition module 270 of FIG. 2. In step 410 of FIG. 4, a prompt may be received from the smart traffic signal base software module 280 of FIG. 2. Next, determination step 420 may identify whether a pedestrian is located at or near an intersection from image data collected by a camera. When a pedestrian is identified as being at or near the intersection, information relating to that identification may be stored as a set of attributes in memory (e.g. in pedestrian database 160 of FIG. 1) in step 430 of FIG. 4. Then in step 440, a processor may identify a "safe" or "unsafe" status associated with the pedestrian located in or near the intersection. This pedestrian status may be stored in the memory (e.g. in a pedestrian status database 140 of FIG. 1) in step 450 of FIG. 4. The "safe" or "unsafe" status of the pedestrian may be determined by identifying whether the pedestrian is located in a "safe" cell or in an "unsafe" cell of an intersection using the grid as discussed in FIG. 3. In certain instances, each cell in a grid pattern may be associated with a grid cell number and locations of particular pedestrians may be identified using specific grid cell numbers. Here again each cell in the grid can be associated with either a "safe" status or an "unsafe" status at the intersection. After the pedestrian status is stored in step 450 of FIG. 4, a processor executing instructions consistent with the present disclosure may return to exciting instructions associated with the smart traffic signal base software module 250, previously discussed.

Note that pedestrian status identified in step 440 of FIG. 4 may be identified using a calculation that counts a number of vehicles currently present at the intersection. A count of the number of vehicles may be identified using either camera data or by using data collected by sensors embedded in a roadway near or at a particular intersection. Pedestrian status information may also include indications that current traffic patterns are heavy, normal, light, or dangerous, for example. Such calculations of pedestrian status may be based on comparison of historical data that identifies numbers of vehicles. Various pre-determined thresholds or ranges may be set using the historical data, where a first threshold/range may be associated with heavy traffic, a second threshold/range may be associated with normal traffic, and a third threshold/range may be associated with light traffic. In another embodiment, program code consistent with the present disclosure may also identify other traffic states that may be associated with a danger level. For example, a level of danger may be increased based on the presence of emergency vehicles or an identification that emergency lights or a siren associated with an emergency vehicle have been engaged. In such instances, emergency lights may be identified using camera data and the sound of a siren may be captured by a microphone coupled to a control computer. Intersection danger levels may also be associated with an identification that vehicle is approaching an intersection at a high speed. In such instances a traffic status or vehicle count may be stored in the traffic database, such a traffic database 145 of FIG. 1. At any given time, a traffic signal light controller may assign a status to traffic at an intersection.

Figure 5:
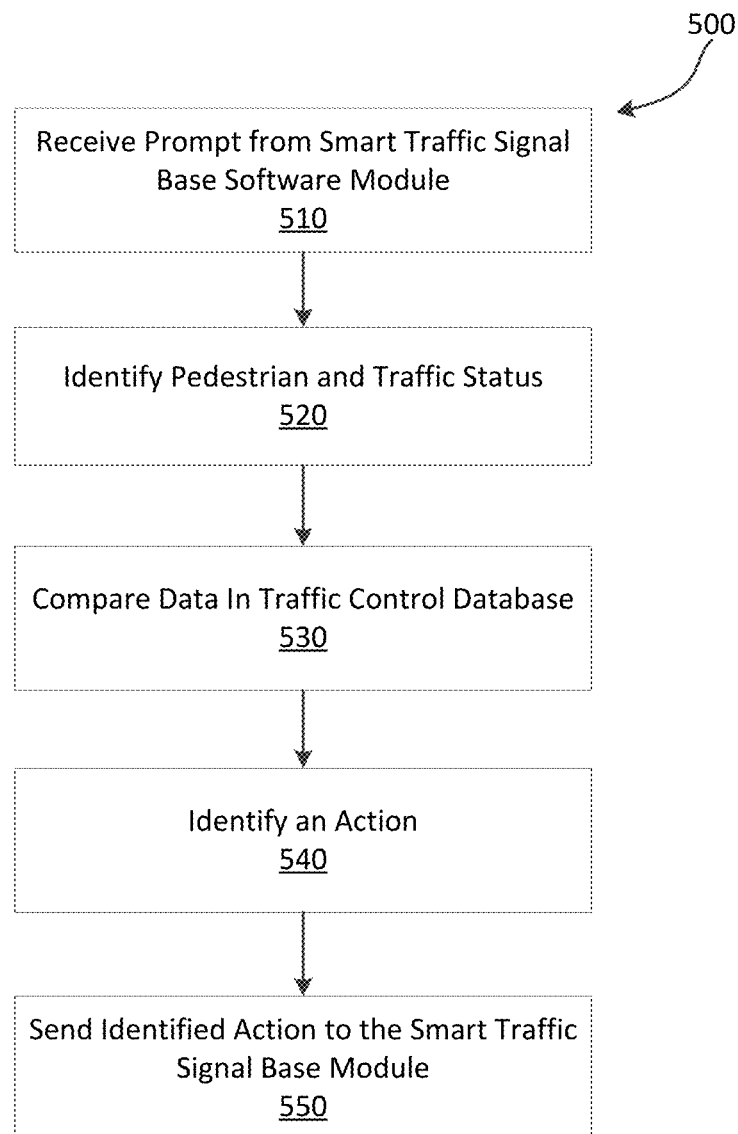
FIG. 5 illustrates a set of steps that may performed by a computer that controls actions at an intersection.

FIG. 5 illustrates a set of steps that may performed by a computer that controls actions at an intersection. The steps of flow chart 500 of FIG. 5 may be performed by a set of program code consistent with the traffic control software module the traffic control software module 280 of FIG. 2. Step 510 of FIG. 5 is a step where a prompt may be received from program code associated with the smart traffic base software module 250 of FIG. 2. This prompt may cause a processor to execute instructions associated with the flow chart 500 of FIG. 5. After step 510, pedestrian status and traffic status may be identified in step 520 of FIG. 5.

Actions that may be initiated by a signal light control computer may include, yet are not limited to increasing or decreasing an amount of time a "walk" indication is illuminated at an intersection, shining a light on a pedestrian crossing an intersection, switching all walk/do not walk indicators to indicate a do not walk status at an intersection, or switching specific indicators to provide a "walk" indication.

Next, in step 530 of FIG. 5, a comparison may be performed that compares status information with data stored in a traffic control database 155 of FIG. 1. The comparison performed in step 530 may be made by comparing data stored in the traffic control database 155. These programmable actions may be associated with respect a current traffic status and current pedestrian status identified in step 520 of FIG. 5. These programmable actions may be identified in step 540 of FIG. 5. In an instance when a current traffic status is "normal" and current pedestrian status is "safe," an identified action may be to reduce timing of a green "walk indicator" after a pedestrian crossed an intersection. In another instance, when a current traffic status is "heavy traffic" and pedestrian status is safe, then timing of the green light may not be changed, but a light may be illuminated on the sidewalk so as to make the pedestrian more visible to vehicle drivers. After step 540, the identified action may be sent to program code such as the smart traffic signal base software module 250 of FIG. 2. At this point, control may return back to the smart traffic signal base module 250 of FIG. 2. Alternatively pedestrians that move into an unsafe area of an intersection may be illuminated.

Figure 6:
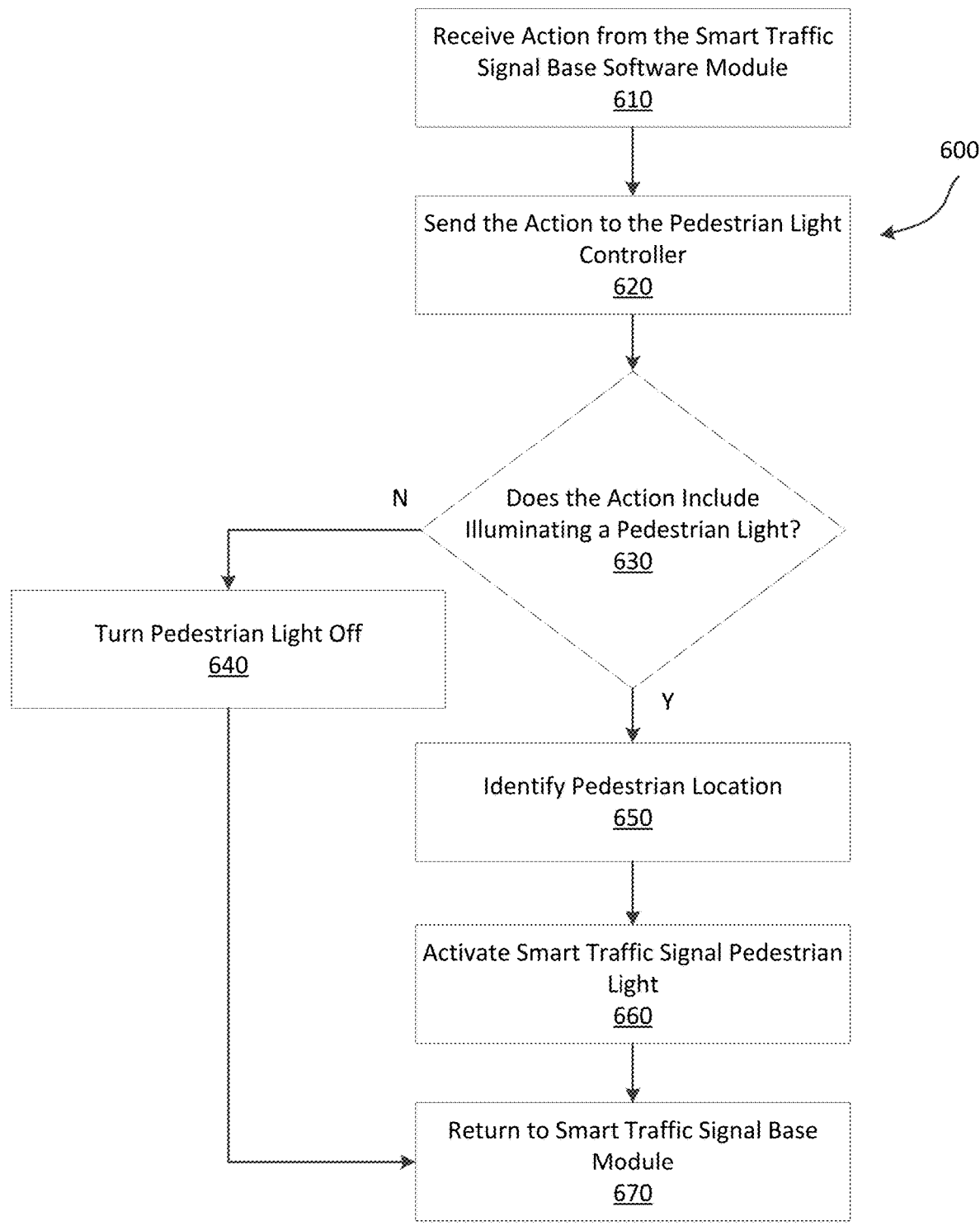
FIG. 6 illustrates a series of steps that may be used to illuminate lights as pedestrians cross an intersection.

FIG. 6 illustrates a series of steps that may be used to illuminate lights as pedestrians cross an intersection. These pedestrian lights may shine on the pedestrians to make them more visible to drivers driving down a roadway. Lights that illuminate pedestrians as the cross an intersection may result in increasing the safety of pedestrians at night or in low visibility conditions. Alternatively pedestrians may be illuminated when the stray into an unsafe area of an intersection. In step 610 of FIG. 6, an action may be received from the smart traffic signal base software module 250 of FIG. 2 and then that action may be sent to a pedestrian light controller in step 620. Determination step 630 may then identify whether the received action includes illuminating a pedestrian light. When the received action does not include illuminating a pedestrian light program flow may move to step 640 where a pedestrian light may be turned off (or terminated) after which program flow may move to step 670 where program control may be returned to the smart traffic signal base module 250 of FIG. 2. In certain instances a pedestrian light may be turned off when the pedestrian moves from an unsafe area to a safe area.

When determination step 630 identifies that a pedestrian light should be turned on, a location of a pedestrian may be identified in step 650, the pedestrian light may be illuminated (activated) in step 660, and then program control may be returned to program code of the smart traffic signal base module in step 607 FIG. 6. Pedestrian lights may be used at times when light conditions are low, for example, at night time or when it is raining. Low light conditions could be detected by a computer that is coupled to a light sensor. Pedestrian lights may be a spot light that illuminates the body of a pedestrian from above or these lights may be built into crosswalks where they may illuminate pedestrians by shining lights that illuminate the legs and body of a pedestrian. In certain instances, the location of a pedestrian may be continuously updated and various different lights may be illuminated or turned off as the pedestrian moves through the intersection. In such instances, each different light may correspond to a cell in a grid. After the pedestrian has safely crossed the intersection, each of the pedestrian lights may be turned off.

Table 1 provided below illustrates data that may be stored in an intersection grid database, such as the intersection grid database 150 of FIG. 1. Table 1 includes a series of columns and rows that may be used to cross-reference an intersection identifier (ID), a cell ID, a granularity level, and a safety (safe/unsafe) status. The granularity level of table 1 may correspond to a level of accuracy or resolution that corresponds to a coarse or a fine accuracy or resolution. A coarse accuracy may identify a true position of a pedestrian with and accuracy of plus or minus three feet and a fine accuracy may identify a true position of the pedestrian with an accuracy of plus or minus one foot. Generally, a coarse accuracy/resolution will correspond to a larger grid size and a fine accuracy/resolution will correspond to a smaller grid size.

Note that a first row in table 1 indicates that a pedestrian is currently located in a location associated with cell ID 1 at intersection X123, that the location detection accuracy of the pedestrian is coarse, and that intersection X123 currently is associated with a safe status. Note also that a last row in table 1 indicates that another pedestrian is currently located in cell 60 of intersection H456. Note also that the location detection accuracy of cell 60 is fine and that intersection H456 is currently associated with an unsafe status. In certain instances, cells lying on crosswalks or sidewalks may be considered as safe while cells lying in middle of the intersection are considered as unsafe. Alternatively or additionally, a safe or unsafe status may correspond to traffic conditions. For example, locations within a crosswalk may be considered unsafe in heavy traffic conditions at a time immediately after a traffic signal controlling vehicle traffic has turned red. After vehicle traffic has been identified as being in a stopped state, the locations within the crosswalk may be assigned a safe status.

TABLE 1

Exemplary Data Stored in an Intersection Grid Database

| Intersection ID | Cell ID | Granularity Level | Safe/Unsafe |
|---|---|---|---|
| X123 | 1 | Coarse | Safe |
| X123 | 2 | Coarse | Safe |
| X123 | 3 | Coarse | Unsafe |
| X123 | ... | ... | ... |
| X123 | 30 | Coarse | Unsafe |
| H456 | 1 | Fine | Safe |
| H456 | 2 | Fine | Safe |
| H456 | ... | ... | ... |
| H456 | 60 | Fine | Unsafe |

Table 2 illustrates data that may be stored in database that tracks pedestrian (e.g. a pedestrian database 160 of FIG. 1). Table 2 cross-references a pedestrian identifier (ID), an intersection ID, a cell ID, and times. Note that table 1 tracks the position of different pedestrians as those pedestrians cross intersection X123. The first four rows of table 1 includes information that tracks the movement of pedestrian 1 as pedestrian 1 moves from cell ID 1 to cell ID 4. Note that pedestrian 1 entered cell ID 1 at 10:30:00 am and that pedestrian 1 entered cell Id 4 at 10:30:21.

TABLE 2

Exemplary Data that may be stored in a Pedestrian Tracking Database

| Pedestrian ID | Intersection ID | Cell ID | Time Stamp |
|---|---|---|---|
| 1 | X123 | 1 | 4/11/2017 10:30:00 |
| 1 | X123 | 2 | 4/11/2017 10:30:10 |
| 1 | X123 | 3 | 4/11/2017 10:30:15 |
| 1 | X123 | 4 | 4/11/2017 10:30:21 |
| 2 | X123 | 16 | 4/18/2017 12:30:12 |
| 2 | X123 | 17 | 4/20/2017 12:30:27 |
| ... | ... | ... | ... |
| N | N354 | 32 | 4/22/2017 16:30:00 |

Table 3 illustrates data that may be stored in the pedestrian status database 140 of FIG. 1. The data in table 3 cross-references a pedestrian ID with an intersection ID and with a safety status. Note that pedestrian 1 is associated with a safe status at intersection X123 and that pedestrian 2 is associated with an unsafe status at intersection X123. This may mean that pedestrian 1 is crossing intersection X123 safely by staying within a crosswalk at a time a "walk" indication is displayed, and this may mean that pedestrian 2 is crossing intersection X123 in an unsafe manner. In such an instance pedestrian 2 may be crossing intersection X123 when a "do not walk" indication is displayed at intersection X123.

TABLE 3

Exemplary Data that may be stored in a Pedestrian Status Database

| Pedestrian ID | Intersection ID | Status |
|---|---|---|
| 1 | X123 | Safe |
| 2 | X123 | Unsafe |
| 3 | Z456 | Safe |
| 4 | E231 | Safe |
| 5 | B678 | Safe |
| 6 | H456 | Unsafe |
| ... | ... | ... |
| N | N354 | Unsafe |

Table 4, shown below, illustrates data that may be stored in the traffic database 145 of FIG. 1. Table 4 cross-references an intersection IDs, traffic IDs, vehicle counts, times, and traffic status. The traffic ID may indicate a direction of travel, for example a traffic ID of NS may identify to a North-South direction and a traffic ID of EW may identify an East-West direction. As such, the data stored a second row in table 4 may be used to identify that a vehicle count of 45 corresponds to heavy traffic in an East-West direction of travel at intersection A987 at 16:30:00 hours on Apr. 13, 2017. Note also that traffic levels at different intersections are classified a normal. This normal status may be assigned based a historical average of numbers of vehicles that have been collected over time as compared to a threshold level. Such thresholds may vary from one intersection to another as each respective intersection may include different numbers of traffic lanes and each intersection may have a different historical average levels of vehicle traffic. Note that a last row in table 4 indicates that a North-South direction of travel at intersection N354 was assigned a danger traffic status at 16:20:00 hours on Apr. 22, 2017. As mentioned above, such a danger status may be identified based on the presence of emergency vehicles or speeding vehicles that are approaching the intersection.

TABLE 4

Exemplary Data that may be stored in a Traffic Database

| Intersection ID | Traffic ID | Vehicle Count | Time Stamp | Traffic Status |
|---|---|---|---|---|
| X123 | NS | 12 | 4/11/2017 10:30:00 | Normal |
| A987 | EW | 45 | 4/13/2017 16:30:00 | Heavy |
| Z456 | NS | 2 | 4/13/2017 10:30:00 | Normal |
| E231 | NS | 23 | 4/15/2017 10:30:00 | Heavy |
| B678 | EW | 5 | 4/18/2017 10:30:00 | Normal |
| H456 | EW | 0 | 4/20/2017 12:30:00 | Normal |
| ... | ... | ... | ... | ... |
| N354 | NS | 67 | 4/22/2017 16:30:00 | Danger |

Table 5 illustrates data that may be stored in the traffic control database 155 of FIG. 1. The data in table 5 cross-references intersection IDs, traffic IDs, traffic statuses, pedestrian statuses, action types, and the status of pedestrian lights. Information stored in table 5 may be used to identify traffic and safety status associated with a particular travel direction and in a particular direction of travel. Here again a column storing traffic IDs may be used to identify travel direction, where NE indicates North-East, NW indicates North-West, SE indicates South-East, and NE indicates North-East directions. Traffic statuses included in table 5 are normal, heavy, and danger, and pedestrian status include safe & unsafe. Table 5 also identifies action types, where pedestrian lights may be illuminated or tuned off (terminated). Various different actions included in table 5 include decrease pedestrian walk signal time, hold all walk signal indicators in a RED state, no action, and hold selective traffic lights in a RED state. The data stored in FIG. 5 may be used to identify current traffic status, safety conditions, and actions currently being performed at particular intersections.

TABLE 5

Exemplary Data that may be stored in a Traffic Control Database

| Intersection ID | Traffic ID | Traffic Status | Pedestrian Status | Action Type - Traffic Signal | Action Type - Pedestrian Light |
|---|---|---|---|---|---|
| X123 | NE | Heavy | Safe | Decrease Pedestrian Walk Signal Time to allow Traffic to ease | Illuminate |
| X123 | NW | Heavy | Unsafe | Hold All Walk Signals as RED | Illuminate |
| X123 | SE | Danger | Safe | No Action | Illuminate |
| X123 | SW | Danger | Unsafe | Hold All Walk Signals as RED | Illuminate |
| X123 | NE | Normal | Safe | No Action | Terminate |
| X123 | NW | Normal | Unsafe | Hold selective Traffic Lights Red | Illuminate |

Figure 7:
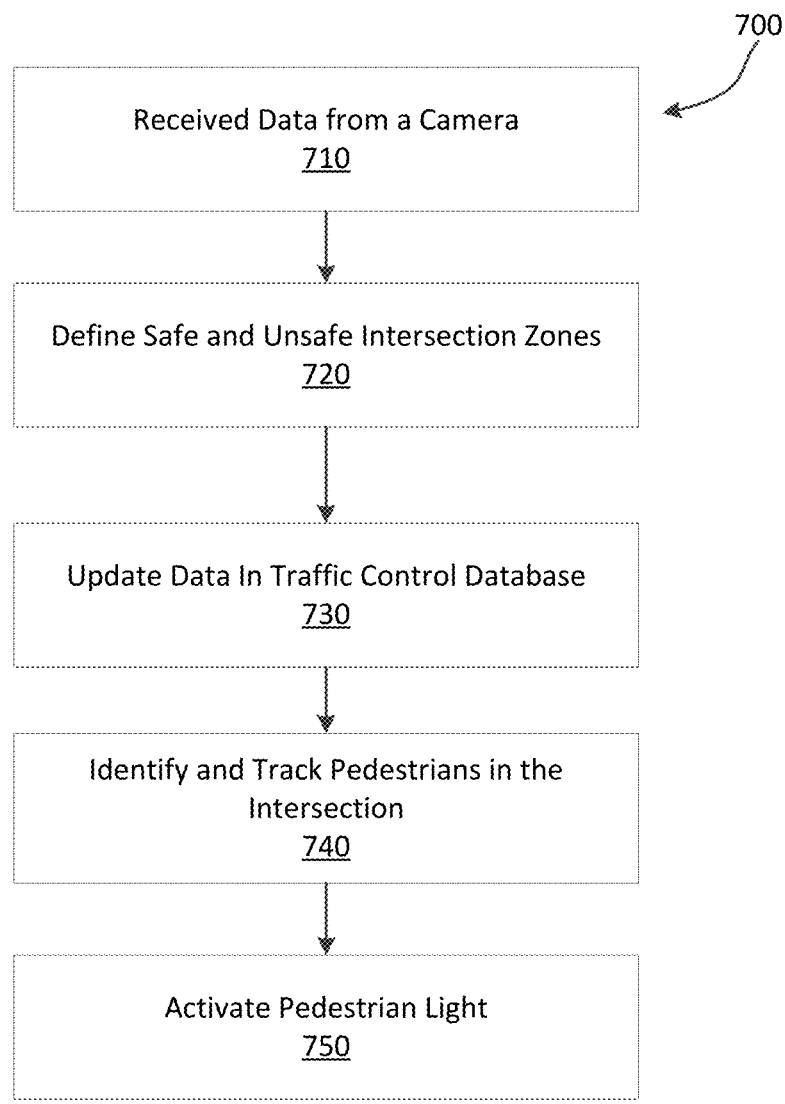
FIG. 7 illustrates a series of steps that may be performed by a traffic control system when that control system identifies whether a light should be activated to illuminate a pedestrian at an intersection to increase pedestrian safety.

FIG. 7 illustrates a series of steps that may be performed by a traffic control system when that control system identifies whether a light should be activated to illuminate a pedestrian at an intersection to increase pedestrian safety. Functions of the traffic control system 700 may be performed by computer 105 of FIG. 1 or by computer 200 of FIG. 2. In step 710, data may be received from camera or from other sensors at an intersection and then in step 720 safe and unsafe zones at the intersection are identified. Here again the camera may be any type of camera known in the art. As such this camera may be a wide-angle fish-eye camera, a closed circuit television (CCTV) camera, or an infrared camera, for example. Furthermore, sensors located at an intersection may include induction loops. The safe and unsafe status classifications of the cells in a grid may depend upon pre-determined rules. Here again cells lying on crosswalk or sidewalks may be considered as safe while cells lying in middle of the intersection may be considered as unsafe. Other rules may also identify safe or unsafe conditions and these rules may identify unsafe conditions based on the presence of emergency vehicles, an identification of a speeding car, a pedestrian crossing a crosswalk when a "do not walk" indication is posted, may be based on an amount of traffic, or may be associated with an identification that oncoming traffic has not yet stopped after a traffic signal has turned red.

After the intersection safe and unsafe zones are identified, data stored in the traffic control data base 155 of FIG. 1 may be updated in step 730 of FIG. 7 to include current information about the status of an intersection. Next in step 740, pedestrians crossing the intersection may be identified and tracked and then a pedestrian light may be activated according to a rule in step 750. Rules used to identify when a pedestrian light should be activated may be based on an amount of ambient light at an intersection, poor visibility, or an unsafe status. Here again, when pedestrian lights are activated, different lights may be used to illuminate a pedestrian as that pedestrian crosses an intersection.

Figure 8:
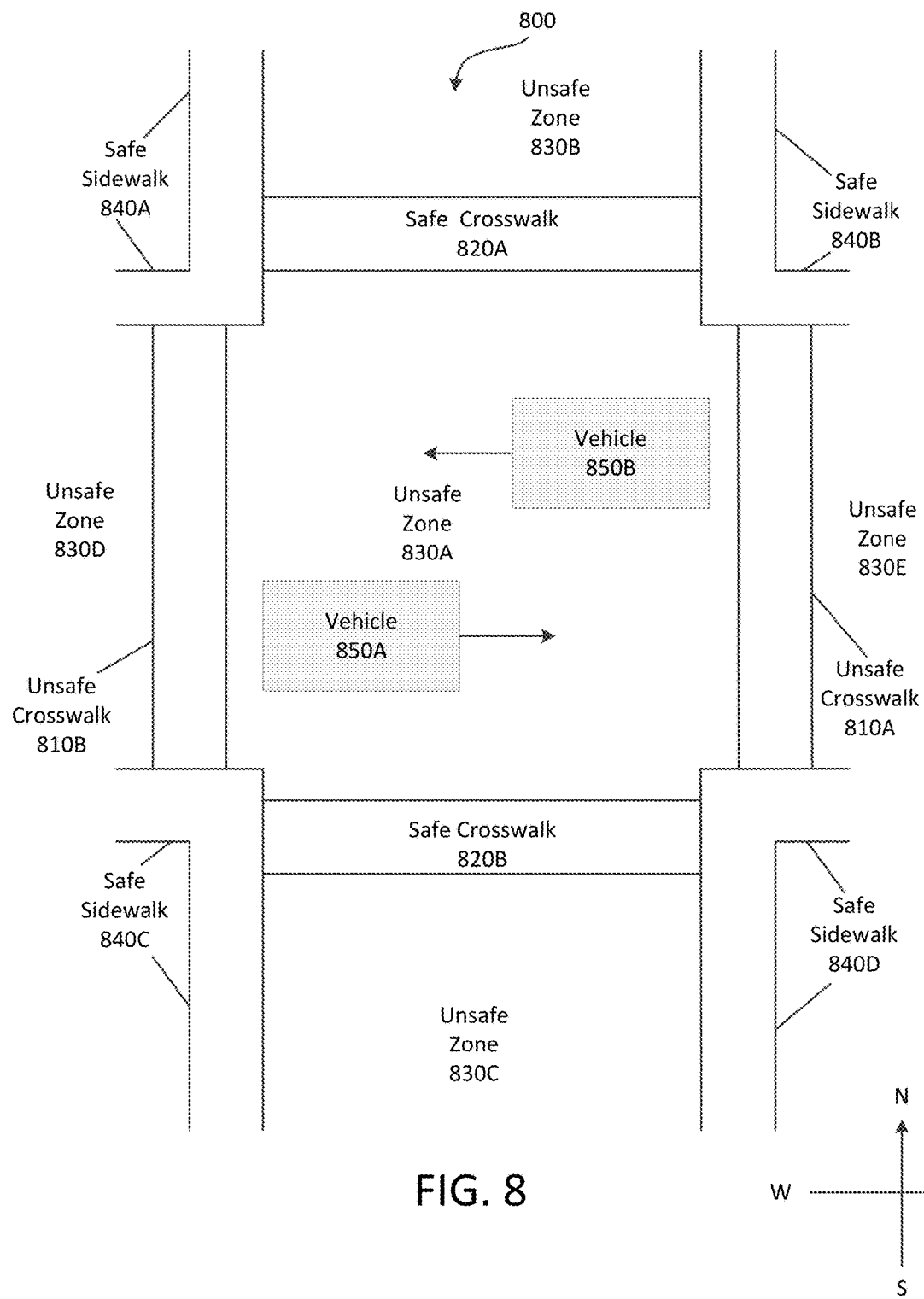
FIG. 8 illustrates an intersection where safe and unsafe zones are identified.

FIG. 8 illustrates an intersection where safe and unsafe zones are identified. The intersection 800 of FIG. 8 includes unsafe crosswalks 810A & 810B, safe crosswalks 820A & 820B, safe sidewalks 840A through 840D (840A, 840B, 840C, & 840D), unsafe zones 830A through 830E (830A, 830B, 830C, 830D, & 830E), and vehicles 850A & 850B. FIG. 8 includes a compass that shows North (N), South (S), East (E), and Western (W) directions. Note that vehicle 850A is traveling through intersection 800 in an Eastern direction as indicated by a first arrow and that vehicle 850B is traveling through the intersection in a Western direction as indicated by a second arrow. Note that unsafe zones 830A through 830E may be identified as being safe because these zones are not located within a sidewalk or within a cross walk. Crosswalks 810A and 810B are currently associated with an unsafe status because a current traffic light sequence is allowing vehicles 850A & 850B to drive over these crosswalks 810A & 810B. Crosswalks 820A & 820B are currently associated with a safe status because of the current traffic light sequence allows pedestrians to use crosswalks 820A & 820B. Sidewalks 840A through 840D may be assigned a safe status based on a rule that identifies that sidewalks should always be associated with a safe status. As discussed previously, a controller that receives image data, traffic status data, and pedestrian status data may partition an intersection into grids, where cells in those grids are assigned a safe or an unsafe status based on one or more rules.

FIG. 9 illustrates a computing system that may be used to implement an embodiment of the present invention. The computing system 900 of FIG. 9 includes one or more processors 910 and main memory 920. Main memory 920 stores, in part, instructions and data for execution by processor 910. Main memory 920 can store the executable code when in operation. The system 900 of FIG. 9 further includes a mass storage device 930, portable storage medium drive(s) 940, output devices 950, user input devices 960, a graphics display 970, peripheral devices 980, and network interface 995.

The components shown in FIG. 9 are depicted as being connected via a single bus 990. However, the components may be connected through one or more data transport means. For example, processor unit 910 and main memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 920.

Portable storage device 940 operates in conjunction with a portable non-volatile storage medium, such as a FLASH memory, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD), a plasma display, an organic light-emitting diode (OLED) display, an electronic ink display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include a modem or a router.

Network interface 995 may include any form of computer interface of a computer, whether that be a wired network or a wireless interface. As such, network interface 995 may be an Ethernet network interface, a BlueTooth™ wireless interface, an 802.11 interface, or a cellular phone interface.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 900 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

Some embodiments of this disclosure, illustrating all its features. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.). The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

What is claimed is:

1. A method for increasing pedestrian safety, the method comprising:
   storing information identifying a safe zone and an unsafe zone at an intersection;
   receiving an image of the intersection, wherein:

the image of the intersection is divided into a set of cells that are classified into the safe zone and the unsafe zone according to pre-determined rules by a controller, the pre-determined rules identify the unsafe zone based on a presence of emergency vehicles, a speeding car, a pedestrian crossing a crosswalk when a "do not walk" indication is posted, an amount of traffic, or an identification that oncoming traffic has not yet stopped after a traffic signal has turned red, and a status of the safe zone and the unsafe zone is changed based on traffic conditions at a time;

identifying a location of a person at the intersection based on the received image;

identifying a condition associated with the intersection based on a comparison of the identified location of the person to the changed status of the safe zone and the unsafe zone; and activating a light that illuminates the person at the identified location based on the identified condition.

2. The method of claim 1, wherein the identified condition is further based on identifying that the location of the person is within the unsafe zone.

3. The method of claim 1, further comprising: tracking the person as the person moves through the intersection; and continuing to illuminate the person as the person moves through the intersection.

4. The method of claim 1, further comprising: identifying that the person has moved into the safe zone; and deactivating the light based on the identification that the person has moved into the safe zone.

5. The method of claim 1, wherein the received sensor data indicates a current amount of visibility, and wherein identifying the condition is further based on the current amount of visibility being below a predefined threshold level.

6. The method of claim 1, further comprising: identifying a current traffic level associated with the intersection; and changing a timing of an indicator at the intersection based on the identified current traffic level.

7. The method of claim 6, wherein identifying the current traffic level includes counting a number of cars at the intersection.

8. The method of claim 6, further comprising identifying a danger based on the identified current traffic level meeting a predefined threshold level.

9. A non-transitory computer-readable storage medium having embodied thereon a program executable by a processor to implement a method for increasing pedestrian safety, the method comprising:

storing information identifying a safe zone and an unsafe zone at an intersection;

receiving an image of the intersection, wherein:
the image of the intersection is divided into a set of cells that are classified into the safe zone and the unsafe zone according to pre-determined rules by a controller, the pre-determined rules identify the unsafe zone based on a presence of emergency vehicles, a speeding car, a pedestrian crossing a crosswalk when a "do not walk" indication is posted, an amount of traffic, or an identification that oncoming traffic has not yet stopped after a traffic signal has turned red, and a status of the safe zone and the unsafe zone is changed based on traffic conditions at a time;

identifying a location of a person at the intersection based on the received image;

identifying a condition associated with the intersection based on a comparison of the identified location of the person to the changed status of the safe zone and the unsafe zone the safe zone and the unsafe zone; and activating a light that illuminates the person at the identified location based on the identified condition.

10. The non-transitory computer-readable storage medium of claim 9, wherein the identified condition is based on identifying that the location of the person is within the unsafe zone.

11. The non-transitory computer readable storage medium of claim 9, further comprising instructions executable to: track the person as the person moves through the intersection; and continue to illuminate the person as the person moves through the intersection.

12. The non-transitory computer readable storage medium of claim 11, further comprising instructions executable to: identify that the person has moved into the safe zone; and deactivate the light based on the identification that the person has moved into the safe zone.

13. The non-transitory computer readable storage medium of claim 9, wherein the received sensor data indicates a current amount of visibility, and wherein identifying the condition is further based on the current amount of visibility being below a predefined threshold level.

14. The non-transitory computer readable storage medium of claim 9, further comprising instructions executable to: identify a current traffic level associated with the intersection; and change a timing of an indicator at the intersection based on the identified current traffic level.

15. The non-transitory computer readable storage medium of claim 14, wherein identifying the current traffic level includes counting a number of cars at the intersection.

16. The non-transitory computer readable storage medium of claim 14, further comprising instructions executable to identify a danger based on the identified current traffic level meeting a predefined threshold level.

17. A system for increasing pedestrian safety, the system comprising:

memory that stores storing information identifying a safe zone and an unsafe zone at an intersection;

a camera that captures an image of the intersection;

a controller that:
divides the image of the intersection into a set of cells that are classified into the safe zone and the unsafe zone according to pre-determined rules, wherein the pre-determined rules identify the unsafe zone based on a presence of emergency vehicles, a speeding car, a pedestrian crossing a crosswalk when a "do not walk" indication is posted, an amount of traffic, or an identification that oncoming traffic has not yet stopped after a traffic signal has turned red, and a status of the safe zone and the unsafe zone is changed based on traffic conditions at a time;

identifies a location of a person at the intersection based on the image; and identifies a condition associated with the intersection based on a comparison of the identified location of the person to the changed status of the safe zone and the unsafe zone; and a light that is activated to illuminate the person at the identified location based on the identified condition.

18. The system of claim 17, wherein the identified condition is further based on identifying that the location of the person is within the unsafe zone.

19. The system of claim 17, wherein the controller further tracks the person as the person moves through the intersection, and wherein the light continues to illuminate the person as the person moves through the intersection.

20. The system of claim 19, wherein the controller further: identifies that the person has moved into the safe zone, and deactivates the light based on the identification that the person has moved into the safe zone.

* * * * *